(12) United States Patent
MacInnis et al.

(10) Patent No.: US 7,469,012 B2
(45) Date of Patent: Dec. 23, 2008

(54) SYSTEM AND METHOD FOR TRANSCODING ENTROPY-CODED BITSTREAMS

(75) Inventors: Alexander G. MacInnis, Los Altos, CA (US); Vivian T. Hsiun, Yorba Linda, CA (US)

(73) Assignee: Broadcom Corporation, Irvine, CA (US)

( * ) Notice: Subject to any disclaimer, the term of this patent is extended or adjusted under 35 U.S.C. 154(b) by 390 days.

(21) Appl. No.: 10/273,515

(22) Filed: Oct. 18, 2002

(65) Prior Publication Data

US 2003/0215018 A1 Nov. 20, 2003

Related U.S. Application Data

(60) Provisional application No. 60/380,520, filed on May 14, 2002.

(51) Int. Cl.
 *H04B 1/66* (2006.01)
(52) U.S. Cl. .................................. 375/240.25
(58) Field of Classification Search ............ 375/240.01, 375/240.25, 240.29, 240.02, 240.12, 245, 375/240.16, 240.15, 240, 240.3, 240.26, 375/240.27, 240.13; 382/236, 233; 372/246; 348/500; 341/98, 65; *H04N 7/12; H04B 1/66*
See application file for complete search history.

(56) References Cited

U.S. PATENT DOCUMENTS

| 5,140,323 | A | * | 8/1992 | Kadono et al. | 341/98 |
|---|---|---|---|---|---|
| 5,471,594 | A | * | 11/1995 | Stone | 710/65 |
| 5,537,440 | A | * | 7/1996 | Eyuboglu et al. | 375/245 |
| 5,764,298 | A | * | 6/1998 | Morrison | 348/500 |
| 5,808,570 | A | * | 9/1998 | Bakhmutsky | 341/65 |
| 5,901,250 | A | * | 5/1999 | Ohara | 382/246 |
| 6,028,635 | A | * | 2/2000 | Owen et al. | 375/240.18 |
| 6,160,844 | A | * | 12/2000 | Wilkinson | 375/240 |
| 6,370,193 | B1 | * | 4/2002 | Lee | 375/240.15 |
| 6,608,866 | B1 | * | 8/2003 | Saunders et al. | 375/240.16 |
| 6,647,061 | B1 | * | 11/2003 | Panusopone et al. | 375/240.12 |
| 6,674,802 | B2 | * | 1/2004 | Knee et al. | 375/240.26 |
| 6,847,735 | B2 | * | 1/2005 | Kajiwara et al. | 382/233 |
| 6,999,512 | B2 | * | 2/2006 | Yoo et al. | 375/240.03 |
| 2002/0110193 | A1 | * | 8/2002 | Yoo et al. | 375/240.02 |
| 2003/0202705 | A1 | * | 10/2003 | Sun | 382/236 |
| 2003/0219072 | A1 | * | 11/2003 | MacInnis et al. | 375/240.25 |

FOREIGN PATENT DOCUMENTS

| EP | 0 627 858 A | 12/1994 |
|---|---|---|
| EP | 1 069 764 A | 1/2001 |
| WO | WO 98/27720 A | 6/1998 |
| WO | WO 98/27734 A | 6/1998 |

OTHER PUBLICATIONS

Bakhmutsky M: "Pair-Match Huffman Transcoding to Achieve a Highly Parallel Variable Length Decoder with Two-Word Bit Stream Segmentation", Proceedings of the SPIE, SPIE, Bellingham, VA, USA; vol. 3021, Feb. 12, 1997 pp. 247-265, XP000648217, ISSN: 0277-786X.

* cited by examiner

*Primary Examiner*—Tung Vo
(74) *Attorney, Agent, or Firm*—McAndrews Held & Malloy, Ltd.

(57) ABSTRACT

A system and method for transcoding an entropy-coded bitstream is presented herein. The syntax elements of the entropy-coded bitstream are decoded and transcoded into a second format. The second format can comprise a simpler format for decoding. The foregoing advantageously alleviates the processing requirements for the video decompression engine.

15 Claims, 5 Drawing Sheets

SYSTEM AND METHOD FOR TRANSCODING ENTROPY-CODED BITSTREAMS

PRIORITY DATA

This application claims the priority benefit of the following provisional patent applications: Ser. No. 60/380,520 filed May 14, 2002 which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention is related to digital video, and more particularly to a system and method for transcoding an entropy-coded bitstream.

A video sequence includes a series of images represented by frames. The frames comprise two-dimensional grids of pixels. An exemplary video sequence, such as a video sequence in accordance with the ITU-656 standard, includes 30 720×480 pixel frames per second. The foregoing results in a bit rate of approximately 165 Mbps for a video sequence.

Multiple video sequences are transmitted together on a communication medium such as a coaxial cable, for example, using a multiple access scheme. The multiple access scheme can include, for example, frequency division multiple access (FDMA), or time division multiple access (TDMA). In a multiple access scheme, each video sequence is associated with a particular channel. As the number of video sequences which are transmitted increases, the bandwidth requirements for the communication medium are further increased.

Accordingly, a number of data compression standards have been promulgated to alleviate bandwidth requirements. One such standard known as Advanced Video Coding (AVC) was developed by the Joint Video Team (JVT) project of the International Organization for Standardization (ISO) and the International Telecommunication Union.

The AVC standard uses a number of techniques to compress video streams, such as motion-based compensation to reduce temporal redundancy. The AVC standard encodes each frame using three main picture types—intra-coded pictures (I-pictures), inter-coded pictures (P-pictures), and Bi-predictive (B-pictures). I-pictures are coded without reference to other pictures and can provide access points to the coded sequence where decoding can begin, but are coded with only moderate compression. P-pictures are coded more efficiently using motion compensation prediction of each block of sample values from some previously decoded picture selected by the encoder. B-pictures provide the highest degree of compression but require a higher degree of memory access capability in the decoding process, as each block of sample values in a B-picture may be predicted using a weighted average of two blocks of motion-compensated sample values.

Motion-based compensation results in varying degrees of compression for the pictures forming the video sequence. Conversely, the pictures are encoded by varying amounts of data. For example, I-pictures tend to require the largest amount of bits for encoding, while B-pictures require the least amount of bits for encoding.

Additionally, the AVC proposed standard includes specifications for encoding various syntax elements using either variable length codes or arithmetic coding. Variable length coding and arithmetic coding are referred to as entropy coding. Entropy coding takes advantage of the probabilities of the various values that the data can take. In general, the most common values are encoded using the least number of bits, while the rarest values are encoded using the highest number of bits. The foregoing causes substantial variance in the number of bits which are used to encode each picture.

At the decoder, uniform length frames, e.g., 720×480 pixels, are displayed at a constant rate. In order to display the video sequence in real-time, each picture must be decoded in uniform lengths of time, to at least some degree. Therefore, pictures with a large number of bits require a much higher decoding rate than the average decoding rate which can be inferred from the transmission bit rate and the display bit rate. In some cases, the peak decoding rate required for displaying video sequences in real time can be as high as 750-1000 Mbps even if the transmitted video data rate is much lower, such as 1 to 10 Mbps.

Additionally, some of the entropy coding specifications can be complex to decode. This inherent complexity, combined with the high peak decoding rates result in very high processing demands.

Accordingly, it would be beneficial if the peak decoding rate requirements for decoding entropy coded information could be alleviated by a scheme wherein the entropy coded information is decoded at a lower, relatively constant rate.

Further limitations and disadvantages of conventional and traditional approaches will become apparent to one of skill in the art, through comparison of such systems with embodiments of the present invention as set forth in the remainder of the present application.

BRIEF SUMMARY OF THE INVENTION

A system, method, and apparatus for transcoding an entropy coded bitstream is presented herein. The entropy coded bitstream is preprocessed by a preprocessor and transcoded to a format that is less complex to decode. In a video decoder, a video decompression engine is used to provide decoded frames at a constant rate. However, the frames are encoded as pictures with widely varying amounts of data in a bitstream. A preprocessor transcodes the bitstream to provide the same information in a different format. The different format is preferably simpler for decoding.

These and other advantages and novel features of the present invention, as well as details of an illustrated embodiment thereof, will be more fully understood from the following description and drawings.

DETAILED DESCRIPTION OF THE INVENTION

Although the following embodiments are described in the context of AVC, it should be appreciated that the invention is not limited to AVC and is applicable in other contexts.

Figure 1:
FIG. 1 is a block diagram of an exemplary communication system wherein the present invention can be practiced.

Referring now to FIG. 1, there is illustrated a block diagram of an exemplary transmission system for providing a video sequence 105 to a display unit 110 over a communication medium 125. A video sequence 105 includes a series of images represented by frames. The frames comprise two-dimensional grids of pixels. An exemplary video sequence 105, such as a video sequence in accordance with ITU-R Bt.601, includes 30 720×480 pixel frames per second.

The communication medium 125 may comprise either a point-to-point link or a network of links, or any combination thereof. The network of links may include either a broadcast network, a switched network, or a packet switched network, such as the internet, or any combination thereof. The links may include, for example, a coaxial cable, an Ethernet connection, a Digital Subscriber Loop (DSL), an optical fiber, a satellite/radio link, or a phone line.

In one embodiment, an encoder 140 receives the video sequence 105 and encodes the video sequence 105 pursuant to the AVC standard. The AVC standard is described in the JVT Final Committee Draft (FCD), which is incorporated by reference herein, in its entirety. Pursuant to the AVC standard, the video sequence 105 is represented by a bitstream 142 comprising a series of data packets. The bitstream of data packets 142 are transmitted over the communication channel 125 and received by a decoder 145. The decoder 145 decodes the bitstream 142, providing video sequence 105' which is imperceptibly different from video sequence 105 to the human eye. The video sequence 105' is provided for display to the display unit 110.

Figure 2:
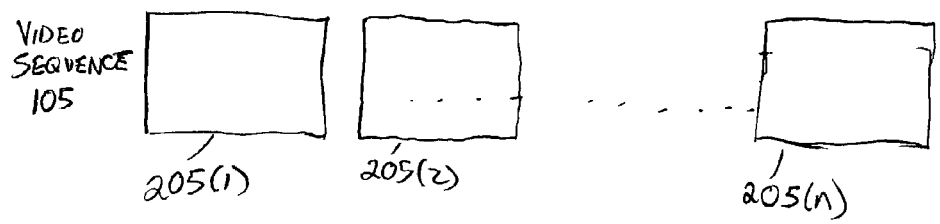
FIG. 2 is a block diagram of a video sequence.
Figure 2:
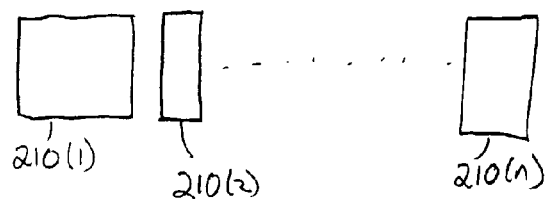

Referring now to FIG. 2, there is illustrated an exemplary video sequence 105. A video sequence 105 comprises frames 205(l) ... 205(n) representing instantaneous time intervals. A frame 205 is a two-dimensional grid of pixels, wherein each pixel in the grid corresponds to a particular spatial location of the image at the particular time interval. In some cases, the frames 205 can comprise two fields, wherein the fields are associated with adjacent time intervals.

Pursuant to AVC, the frames 205(l) ... 205(n) are encoded using algorithms taking advantage of both spatial redundancy and/or temporal redundancy, thereby resulting in a video elementary stream. The algorithms taking advantage of spatial redundancy utilize discrete 4×4 transformation, and quantization, to reduce the amount of data required to code each picture.

The frames 205(l) ... 205(n) are encoded in data structures referred to in the AVC Standard as pictures 210(l) ... 210(n). Each picture 210(x) is associated with a particular frame 205(x), wherein the picture 210(x) comprises the encoded data representing the frame 205(x).

The AVC standard encodes each frame using three main picture types—intra-coded pictures (I-pictures), inter-coded pictures (P-pictures), and Bi-predictive (B-pictures). I-pictures are coded without reference to other pictures and can provide access points to the coded sequence where decoding can begin, but are coded with only moderate compression. P-pictures are coded more efficiently using motion compensation prediction of each block of sample values from some previously decoded picture selected by the encoder. B-pictures provide the highest degree of compression but require a higher degree of memory access capability in the decoding process, as each block of sample values in a B-picture may be predicted using a weighted average of two blocks of motion-compensated sample values.

Motion-based compensation results in varying degrees of compression for the pictures forming the video sequence. Conversely, the pictures are encoded by varying amounts of data. For example, I-pictures tend to require the largest amount of bits for encoding, while B-pictures require the least amount of bits for encoding.

Variable length coding and arithmetic coding are referred to as entropy coding. Entropy coding takes advantage of the probabilities of the various values that the data can take. In general, the most common values are encoded using the least number of bits, while the rarest values are encoded using the highest number of bits. Entropy coding is also used to encode the video sequence. The foregoing adds additional variance in the number of bits which are used to encode each picture 210.

Modern entropy coding methods, such as those used in AVC including arithmetic coding (CABAC) and context adaptive variable length coding (CAVLC), are also complex to decode, compared to simpler variable length coding specifications such as the format specified in MPEG-2 and compared with fixed length coding formats.

The use of varying compression and variable length coding and arithmetic coding are some of the reasons why pictures 210 representing the frames 205 comprise vastly varying amounts of data. As a result, some pictures 210 comprise substantially more data than other pictures.

The pictures 210 are packetized as part of a bitstream known as a video elementary stream. Additional headers are placed on the video elementary stream, thereby resulting in a bitstream known as a transport stream.

Referring again to FIG. 1, at the decoder 145, uniform length reconstructed frames 205, e.g., 720×480pixels, are displayed at a constant rate. In order to display the video sequence 105' in real-time, each picture 210 is decoded in uniform lengths of time, to at least some degree. Therefore, pictures 210 with a large number of bits generally utilize a much higher decoding rate than the average decoding rate which can be inferred from the transmission bit rate and the display bit rate. In some cases, the peak decoding rate required for decoding and displaying video sequences in real time can be as high as 750-1000 Mbps.

The present invention proposes alleviation of the foregoing peak decoding rate by preprocessing the bitstream 142, prior to the point where decoding is in synchronization with the display device 110. The bitstream 142 is preprocessed by a preprocessor and transcoded to a format that is less complex to decode. In a video decoder 145, a video decompression engine is used to provide decoded frames 205 at a constant rate. However, the frames are encoded as pictures with widely varying amounts of data in a bitstream. The preprocessor parses the bitstream 142 and creates a transcoded bitstream 142' that provides the same information in a different format. The different format is preferably simpler for decoding.

Figure 3:
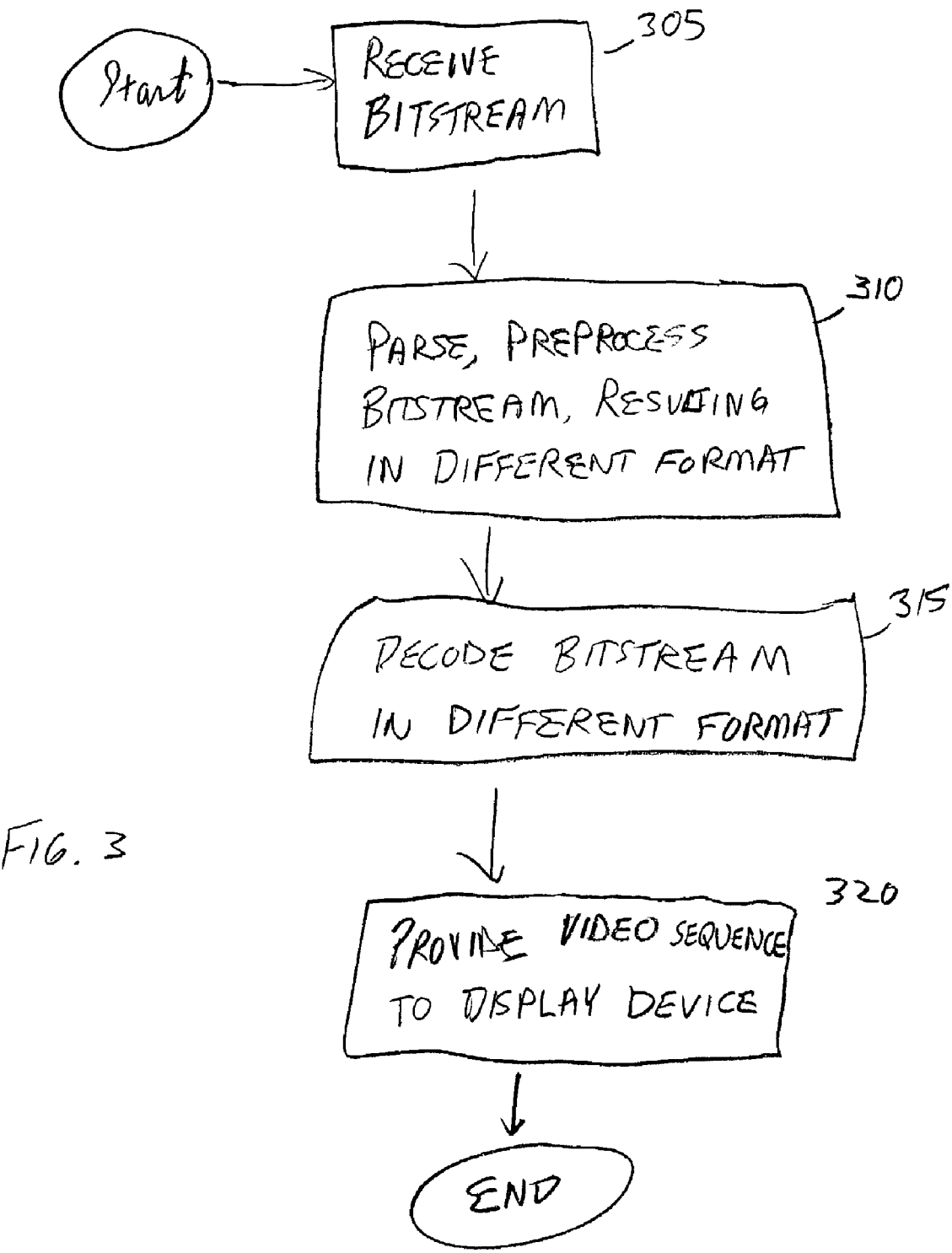
FIG. 3 is a flow diagram describing transcoding in accordance with an embodiment of the present invention

Referring now to FIG. 3, there is illustrated a flow diagram describing the preprocessing of the bitstream 142 in accordance with an embodiment of the present invention. At 305, a bitstream 142 comprising pictures 210 encoded using entropy coding, such as one of the coding formats prescribed in the AVC standard, is received. The bit stream can be encoded using the CABAC or CAVLC formats specified in the AVC Final Committee Draft standard, or alternatively the bit stream may be encoded using an entropy coding method specified by another standard or nonstandard format.

At 310, the bitstream is parsed and preprocessed. The preprocessing transcodes the bitstream 142 into a format that is simpler to decode and that has smoother peak decoding requirements. For example, the simpler format can include a non-entropy coding scheme, or an entropy coding scheme.

As part of the transcoding, the bitstream 142 can be decoded according to the syntax and semantics specified in the standard that applies to the bitstream 142. For example, the arithmetic coding format in AVC, called CABAC, has a complete specification in the standard (i.e. the MPEG AVC FCD, referenced above) that explains how to decode bitstreams 142 that are compliant with the standard. As bitstream 142 is decoded, the result of such decoding is a sequence of syntax elements that are specified in the standard.

Conversion from one entropy coded format to another is straightforward in accordance with the present invention. Each syntax element in the bitstream 142 is parsed from the bitstream and has a range of possible values. Each value corresponds to a code number, and each code number corresponds to a variable length code, according to the design of the coding system in one preferred embodiment. For each syntax element parsed from the input, a corresponding code word is produced.

An example of an output format is the UVLC (Universal VLC) format specified in Working Draft 2 of JVT. It may be advantageous to follow a format sometimes called "exponential golomb codes", wherein each variable length code consists of a prefix followed by an information field. The prefix consists of a string of "0's" followed by a single "1", for example, and the information field has a length determined by the length of the prefix, typically one less than the length of the prefix, and each code maps to a code number. For each syntax element in the bitstream 142, the range of values that the syntax element may take on is mapped to a range of code numbers. This is essentially what is specified in the now-obsolete Working Draft 2 of JVT.

In another embodiment, the bitstream 142 can be transcoded to provide the same information in a different format, wherein each syntax element is represented by the variable length code and wherein the length of each code is a number of 8-bit bytes. For example, values in the range of (−127, +127) can be represented by an 8 bit 2's complement signed number, while the value of −128 can signal that one or more following bytes signal an extension of the range of values.

Alternatively, the bitstream 142 can be transcoded to provide the same information in a different format wherein each syntax element in the bitstream 142 is represented by a fixed length code. It is well known in the art how to design fixed length codes to represent information. For example, a syntax element whose range of values spans no more than −2048 to +2047 can conveniently be represented by a fixed length 12-bit signed number. The number of bits allocated to each syntax element can be the same for all syntax elements, or they can vary between syntax elements, while having the same length to all instances of a given syntax element.

At 315, the transcoded bitstream 142' is decoded, thereby generating a video sequence 105', in synchronization with a display device 110. The transcoded bitstream 142' is easier to decode in synchronization with the display device 110 because the transcoded bitstream is formatted with a simpler encoding scheme during 310. The video sequence 105' can then be provided to the display device 110 (320).

Figure 4:
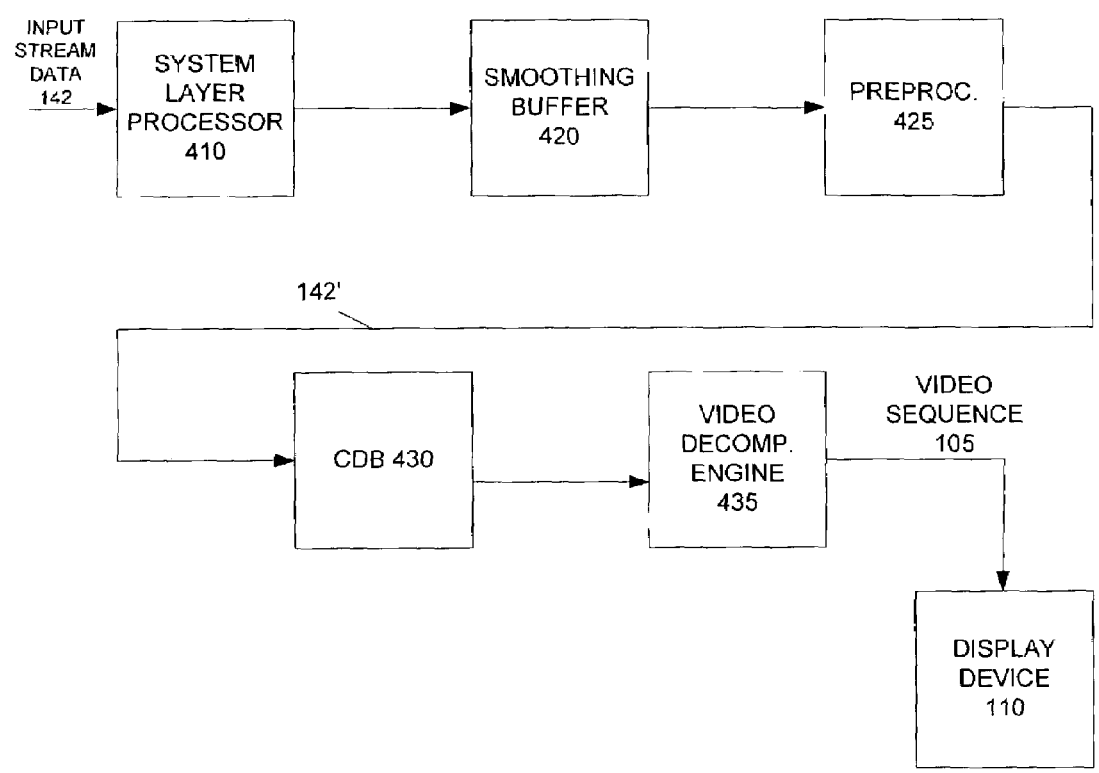
FIG. 4 is a block diagram of an exemplary decoder in accordance with an embodiment of the present invention.

Referring now to FIG. 4, there is illustrated a block diagram of an exemplary decoder 405 in accordance with an embodiment of the present invention. The decoder 405 receives and decompresses a bitstream 142, thereby resulting in a video sequence 105'.

The bitstream 142 comprises pictures 210 encoded using entropy coding, such as the CABAC coding format prescribed in the AVC standard, is received. Alternatively, the bitstream can be encoded using the CAVLC formats specified in the AVC standard, or another entropy coding format specified by another standard or non-standard video format.

The video sequence 105 comprises frames which are provided to, and in synchronization with, a display device 110. The video sequence 105 is provided to the display device 110 by a video decompression engine 435 within the decoder 405. The video decompression engine 435 decompresses the video data in synchronization with a display unit 110. The bitstream 142 is received at rates which may vary from 1-20 Mbps in a typical application.

However, as illustrated in FIG. 2, each picture 210 of the bitstream 142 comprises widely varying amounts of data. Pictures 210 with a large number of bits require a much higher decoding rate than the average decoding rate which can be inferred from the transmission bit rate and the display bit rate.

To ease the processing requirements of the video decompression engine 435, the entropy coded bitstream 147 is preprocessed and transcoded to a format that is less complex to decode and that has a smoother and lower peak decoding requirement. The bitstream 142 is received by a system layer processor 410. The system layer processor 410 parses the system layer, extracting the video elementary stream and any system layer information that may be necessary for decoding and display.

The output of the system layer processor is a bitstream 142 comprising video elementary stream data.

The bitstream can be written to a smoothing buffer 420. The smoothing buffer 420 may be implemented as a Static Random Access Memory (SRAM) on-chip or as a region of Dynamic Random Access Memory (DRAM) off-chip, or other memory design. The smoothing buffer 420 stores the data temporarily and smoothes the data rate.

A preprocessor 425 transcodes the bitstream 142, thereby resulting in a transcoded bitstream 142' that provides the same information as bitstream 142 in a different format. The transcoded bitstream 142' is preferably in a format which is easier to decode and is stored in a compressed data buffer 430.

The video decompression engine 435 receives the transcoded bitstream 142' by reading the compressed data buffer 430. The video decompression engine 435 decompresses the transcoded bitstream 142', thereby generating video sequence 105'. The video sequence 105' is perceptually similar to the original video sequence 105 because the second bitstream contains the same information as the first bitstream.

Additionally, the video decompression engine 435 generates the video sequence 105' in synchronization with the display unit 110. The video decompression engine 435 is able to decompress the transcoded bitstream 142' to generate the video sequence 105' in synchronization with the display unit 110 because the transcoded bitstream 142' is encoded in a format which is simpler to decode.

The decoder can also include buffers and other devices common in video decoders. Details of such devices are well known and are omitted for the sake of clarity.

Figure 5:
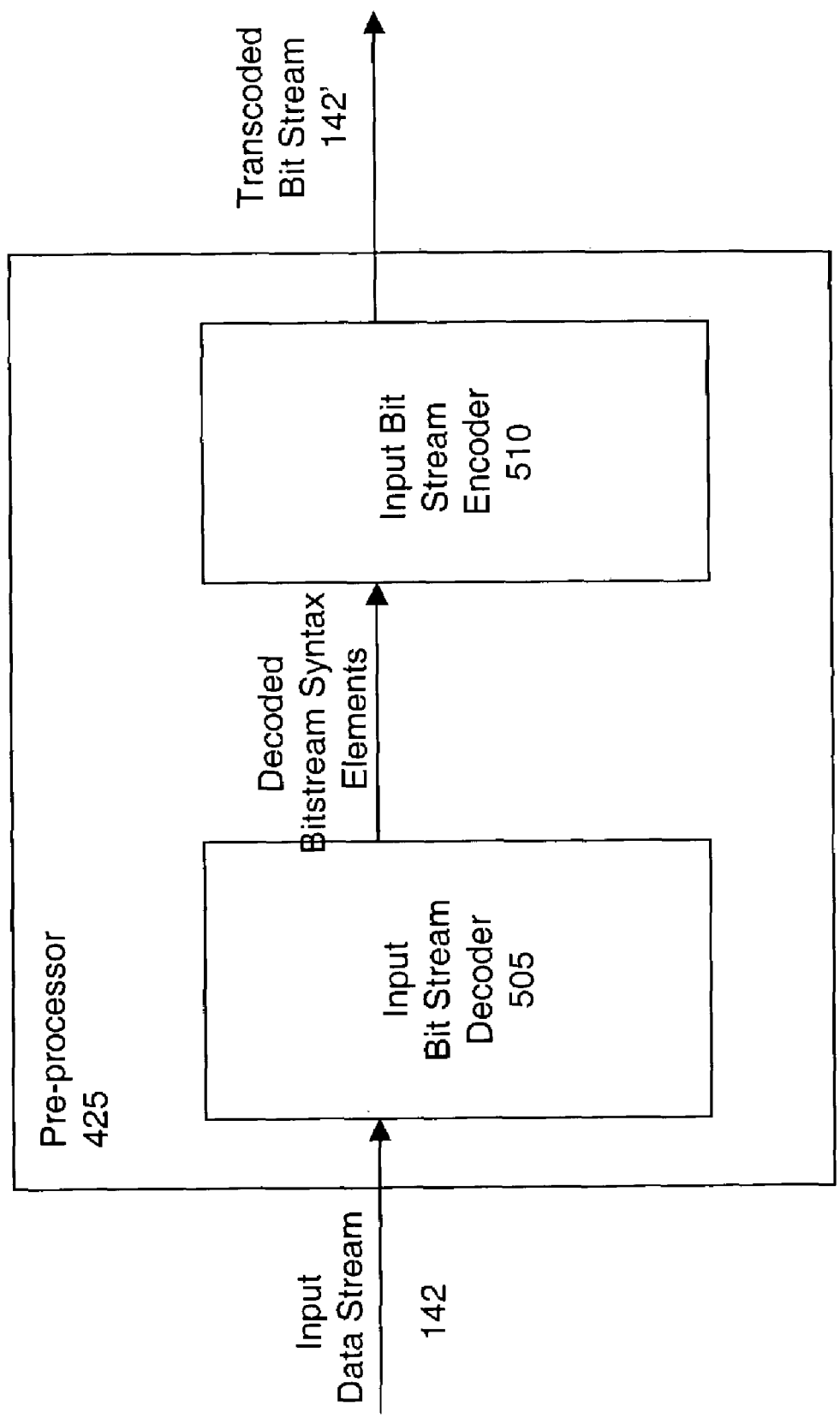
FIG. 5 is a block diagram of an exemplary preprocessor in accordance with an embodiment of the present invention.

Referring now to FIG. 5, there is illustrated a block diagram of an exemplary preprocessor 425 for transcoding an input bitstream 142, thereby resulting in a transcoded bitstream 142'. The input bitstream 142 can comprise for example, entropy-coded video data such as described in the AVC standard. The transcoded bitstream 142' is preferably encoded in a simpler format requiring a lower peak decoding processing capability for display of the video data therein in real time.

The preprocessor 425 comprises an input bitstream decoder 505 and an input bitstream encoder 510. The input bitstream decoder 505 receives bitstream 142 and decodes each entropy coded syntax element, thereby generating a decoded set of syntax elements. The input bitstream decoder 505 provides the decoded bitstream syntax elements to the input bitstream encoder 510. The input bitstream encoder 510 recovers the value of each syntax element in the decoded bitstream of syntax elements and encodes each syntax element in a second format. The foregoing results in a transcoded bitstream 142'. The input bitstream encoder 510 outputs the transcoded bitstream 142' and preferably writes the transcoded bitstream 142' into memory such as the compressed data buffer 430.

Figure 6:
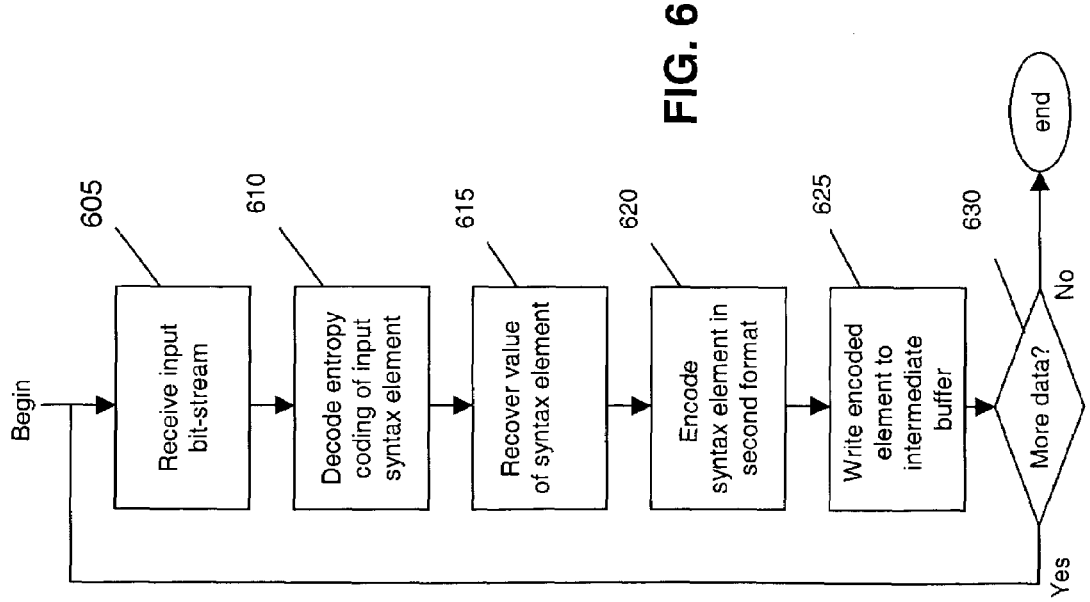
FIG. 6 is a flow diagram describing the operation of the preprocessor in accordance with an embodiment of the present invention.

Referring now to FIG. 6, there is illustrated a flow diagram describing the operation of the preprocessor 425. At 505, the bitstream 142 is received by the preprocessor 425 at the input bitstream decoder 505. At 610, the input bitstream decoder 505 decodes an entropy-coded syntax element. At 615, the value of the syntax element is recovered by the input bitstream encoder 510. The input bitstream encoder 510 encodes the syntax element in the second format at 620. At 625, the preprocessor 425 writes the encoded syntax element with the second format to the compressed data buffer 430. If there is more data in the bitstream at 630, step 605-625 are repeated until the bitstream 142 is finished.

Figure 7:
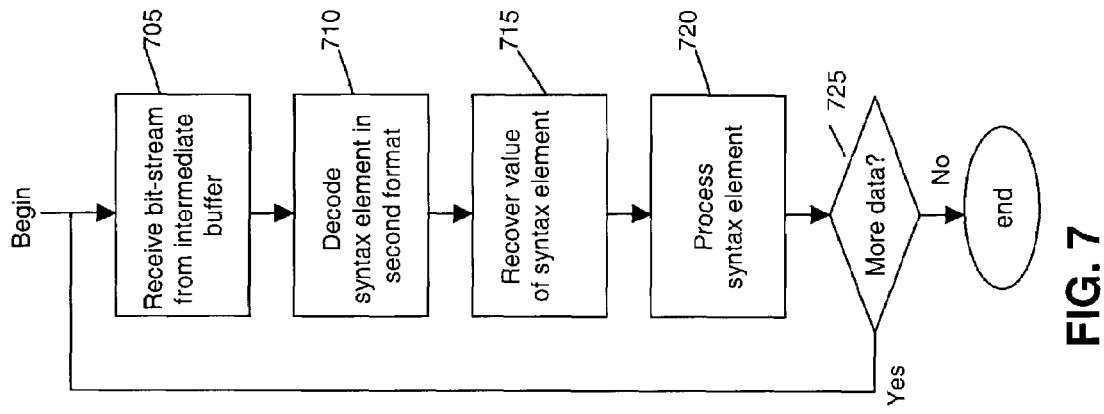
FIG. 7 is a flow diagram describing the operation of the video decompression engine.

Referring now to FIG. 7, there is illustrated a flow diagram describing the operation of the video decompression engine 435. At 705, the video decompression engine 435 receives the transcoded bitstream 142' from the compressed data buffer 430. At 710, the video decompression engine decodes a syntax element in the transcoded bitstream 142'. The value of the syntax element is recovered at 715 and processed at 720. If at 725, there is more data in the transcoded bitstream 142', steps 705-720 are repeated until there is no more data in the second bitstream.

Those skilled in the art will recognize that the foregoing significantly alleviates the processing requirements of decoders. By preprocessing the bitstream, the video decompression engine can more easily generate a video sequence in real-time because the video sequence has a lower peak decoding rate. Accordingly, the processing requirements for the video decompression engine are reduced.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A decoder comprising:
   a preprocessor for transcoding a bitstream encoded with variable length coding to a bitstream encoded with fixed length coding, said preprocessor further comprising:
      an input bitstream decoder for receiving a portion of the bitstream encoded with variable length coding, said portion of the bitstream being associated with a particular picture and decoding a set of syntax elements from said portion of the bitstream encoded with variable length coding; and
      an output bitstream encoder for encoding the set of syntax elements from said portion of the bitstream associated with the particular picture to form the bitstream encoded with fixed length coding, prior to motion compensating the portion of the bitstream associated with the particular picture; and
   a decompression engine for decoding the bitstream encoded with fixed length coding, wherein decoding the bitstream with fixed length coding further comprises motion compensating the portion of the bitstream associated with the particular picture; and
   wherein the decoder receives the bitstream encoded with variable length coding from a communication medium.

2. The decoder of claim 1, further comprising:
   a system layer processor for receiving the bitstream encoded with variable length coding.

3. The decoder of claim 1, further comprising:
   a compressed data buffer for storing the bitstream encoded with fixed length coding.

4. The decoder of claim 1, wherein the encoded with variable length coding comprises entropy coding.

5. The decoder of claim 1, wherein the variable length coding comprises CABAC.

6. The decoder of claim 1, wherein the bitstream with variable length coding is encoded using Advanced Video Coding.

7. The decoder of claim 1, wherein the preprocessor transcodes the bitstream with variable length coding with an exponential golomb code.

8. The decoder of claim 1, wherein the bitstream encoded with variable length encoding encodes a plurality of pictures, and wherein the bitstream encoded with fixed length coding encodes the plurality of pictures, and wherein amounts of the bitstream with variable length encoding that encode each one of the plurality of pictures have a higher variance than amounts of the bitstream with fixed length coding that encode each one of the plurality of pictures.

9. A method comprising:
   receiving a bitstream encoded with variable length coding from a communication medium;
   transcoding the bitstream encoded with variable length coding to a bitstream encoded with fixed length coding after receiving the bitstream encoded with the variable length data from the communication medium, wherein transcoding the bitstream further comprises:
   receiving a portion of the bitstream encoded with variable length coding, said portion of the bitstream being associated with a particular picture and decoding a set of syntax elements from said portion of the bitstream encoded with variable length coding; and
   encoding the set of syntax elements from said portion of the bitstream associated with the particular picture to form said portion of the bitstream encoded with fixed length coding, prior to motion compensating the portion of the bitstream associated with the particular picture; and
   decoding the bitstream with fixed length coding, wherein decoding the bitstream with fixed length coding further comprises motion compensating the portion of the bitstream associated with the particular picture with fixed length coding.

10. The method of claim 9, wherein the variable length coding comprises entropy coding.

11. The method of claim 10, wherein the variable length coding comprises CABAC.

12. The method of claim 11, wherein the bitstream encoded with variable length coding is encoded with Advanced Video Coding.

13. The method of claim 9, wherein the bitstream encoded with variable length encoding encodes a plurality of pictures, and wherein the bitstream encoded with fixed length coding encodes the plurality of pictures, and wherein amounts of the bitstream with variable length encoding that encode each one of the plurality of pictures have a higher variance than amounts of the bitstream with fixed length coding that encode each one of the plurality of pictures.

14. A decoder comprising:
   a preprocessor for transcoding a bitstream encoded with variable length coding to a bitstream encoded with fixed length coding, said preprocessor further comprising:
      an input bitstream decoder for receiving a portion of the bitstream encoded with variable length coding, said portion of the bitstream being associated with a B picture and decoding a set of syntax elements from said portion of the bitstream associated with the B-picture and encoded with variable length coding; and
      an output bitstream encoder for encoding the set of syntax elements from said portion of the bitstream associated with the B-picture to form the bitstream encoded with fixed length coding, prior to motion compensating the portion of the bitstream associated with the B-picture; and
   a decompression engine for decoding the bitstream encoded with fixed length coding, wherein decoding the bitstream with fixed length coding further comprises motion compensating the portion of the bitstream associated with the B-picture; and
   wherein the decoder receives the bitstream encoded with variable length coding from a communication medium.

15. A method comprising:
   receiving a bitstream encoded with variable length coding from a communication medium;
   transcoding the bitstream encoded with variable length coding to a bitstream encoded with fixed length coding after receiving the bitstream encoded with the variable length data from the communication medium, wherein transcoding the bitstream further comprises:
   receiving a portion of the bitstream encoded with variable length coding, said portion of the bitstream being associated with a B picture and decoding a set of syntax elements from said portion of the bitstream associated with the B-picture and encoded with variable length coding; and
   encoding the set of syntax elements from said portion of the bitstream associated with the B-picture to form said portion of the bitstream encoded with fixed length coding, prior to motion compensating the portion of the bitstream associated with the B-picture; and
   decoding the bitstream with fixed length coding, wherein decoding the bitstream with fixed length coding further comprises motion compensating the portion of the bitstream associated with the B-picture with fixed length coding.

* * * * *